Dec. 14, 1965     E. G. GARBE ETAL     3,223,253
BALE STOOKING MACHINES
Filed Feb. 7, 1962     9 Sheets-Sheet 1

INVENTORS
EWALD GUSTAV GARBE
ARTHUR LIKEI
by: R.J. Filipkowski PATENT AGENT

Dec. 14, 1965  E. G. GARBE ETAL  3,223,253
BALE STOOKING MACHINES
Filed Feb. 7, 1962  9 Sheets-Sheet 2
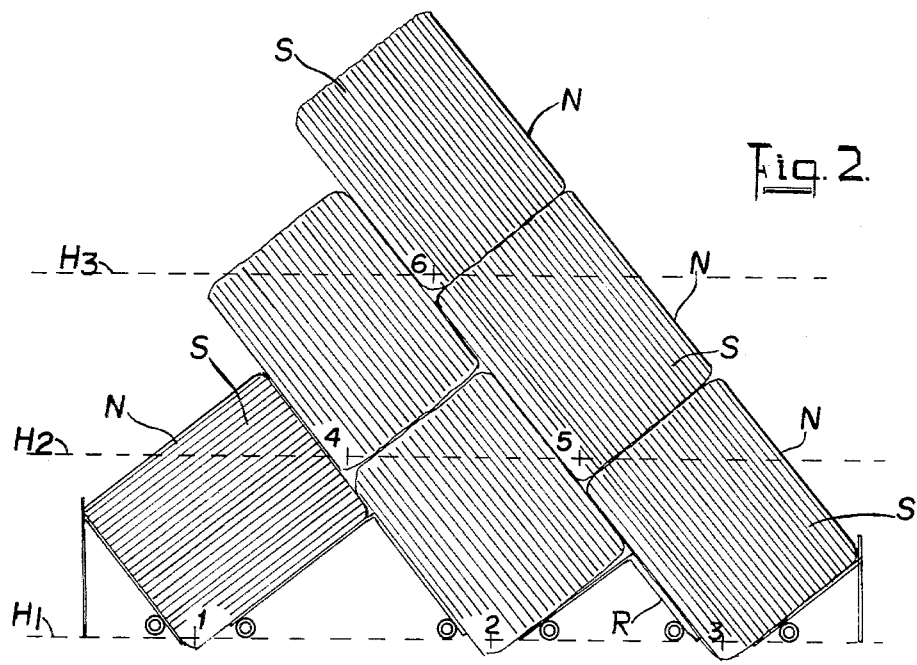
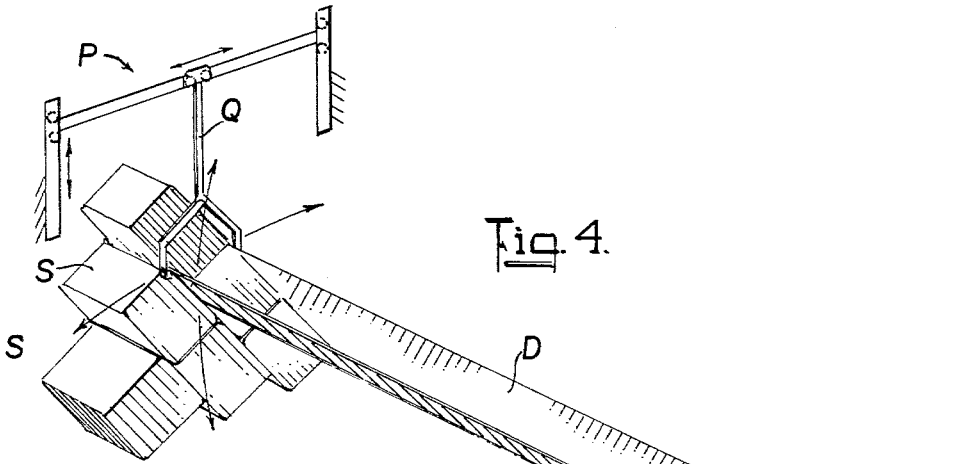
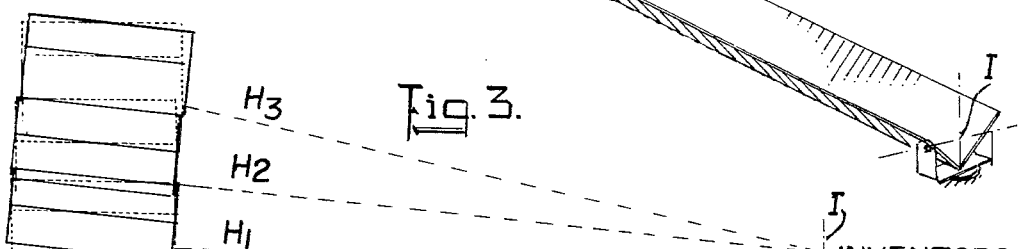
INVENTORS
EWALD GUSTAV GARBE
ARTHUR LIKEI
by R.J. Filipkowski, PATENT AGENT Dec. 14, 1965   E. G. GARBE ETAL   3,223,253
BALE STOOKING MACHINES
Filed Feb. 7, 1962   9 Sheets-Sheet 3
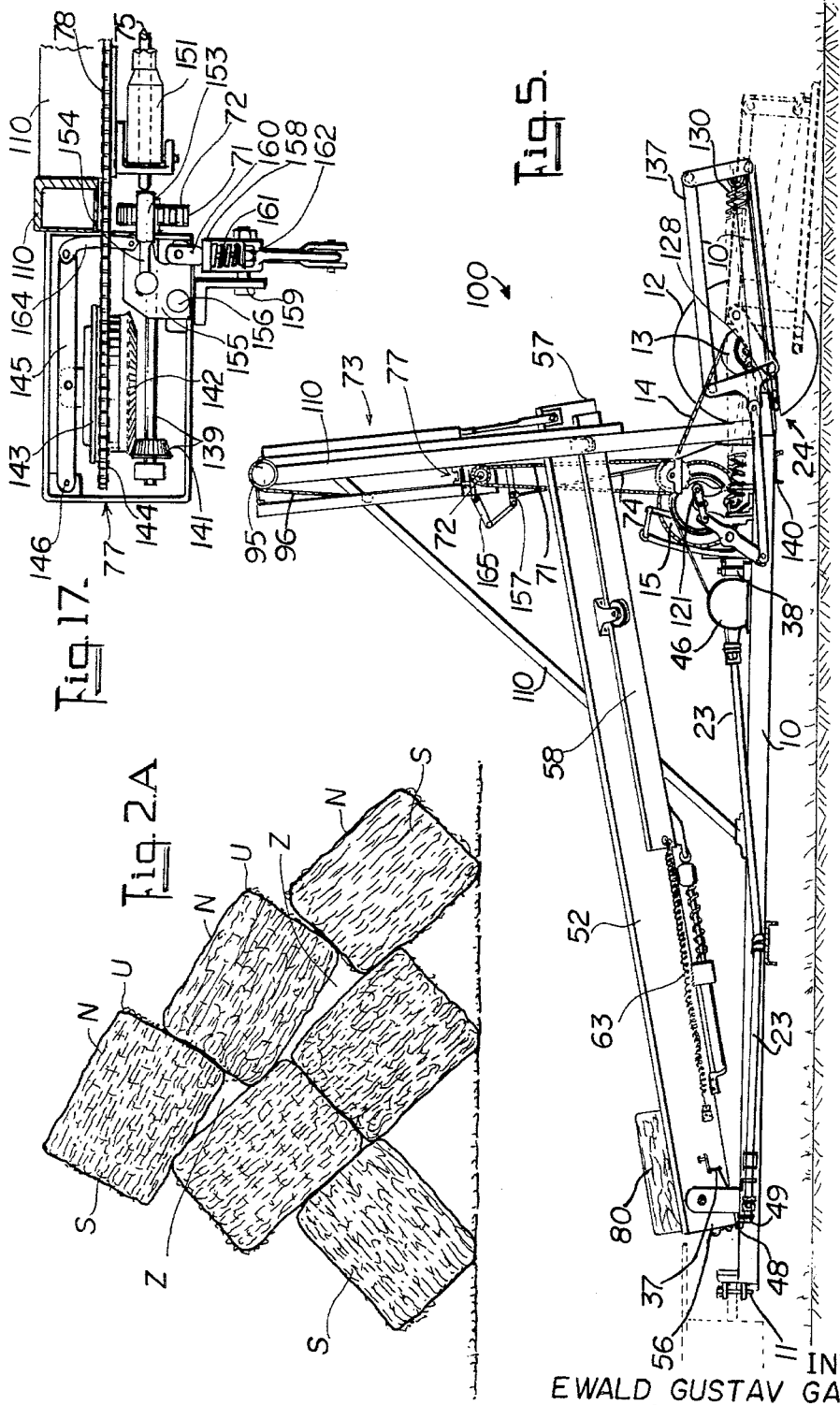
INVENTORS
EWALD GUSTAV GARBE
ARTHUR LIKEI
by R.J. Filipkowski PATENT AGENT

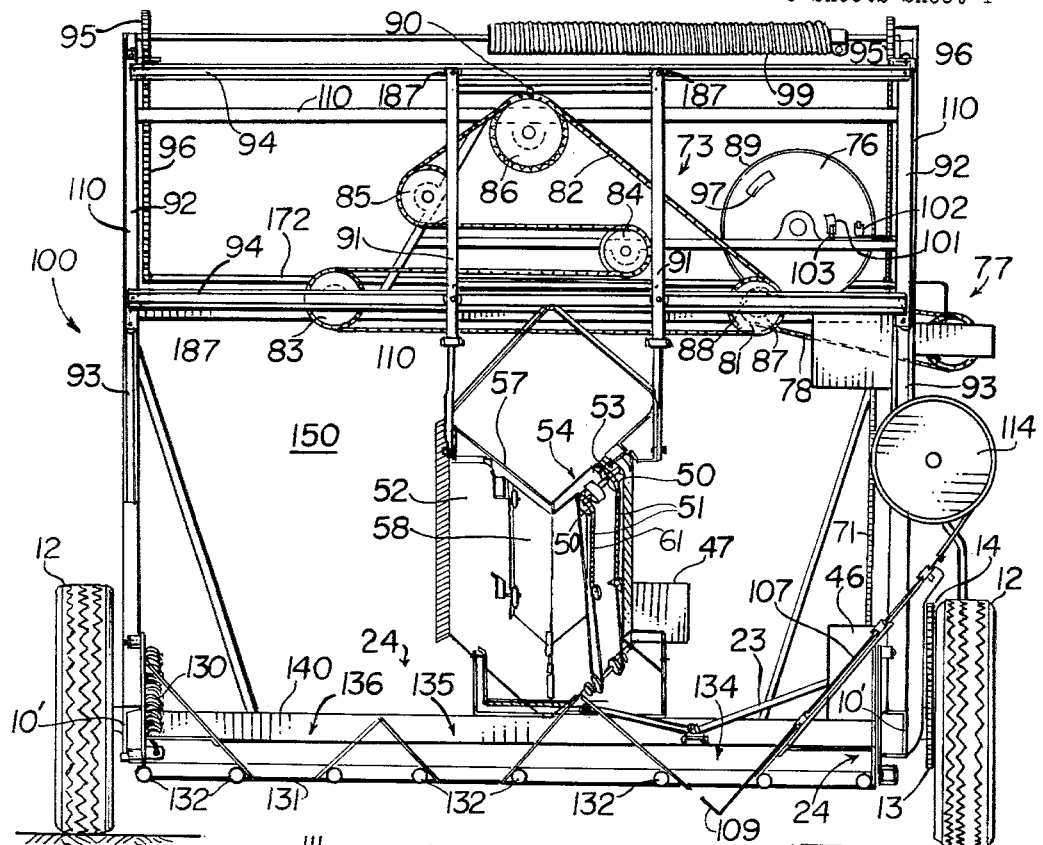
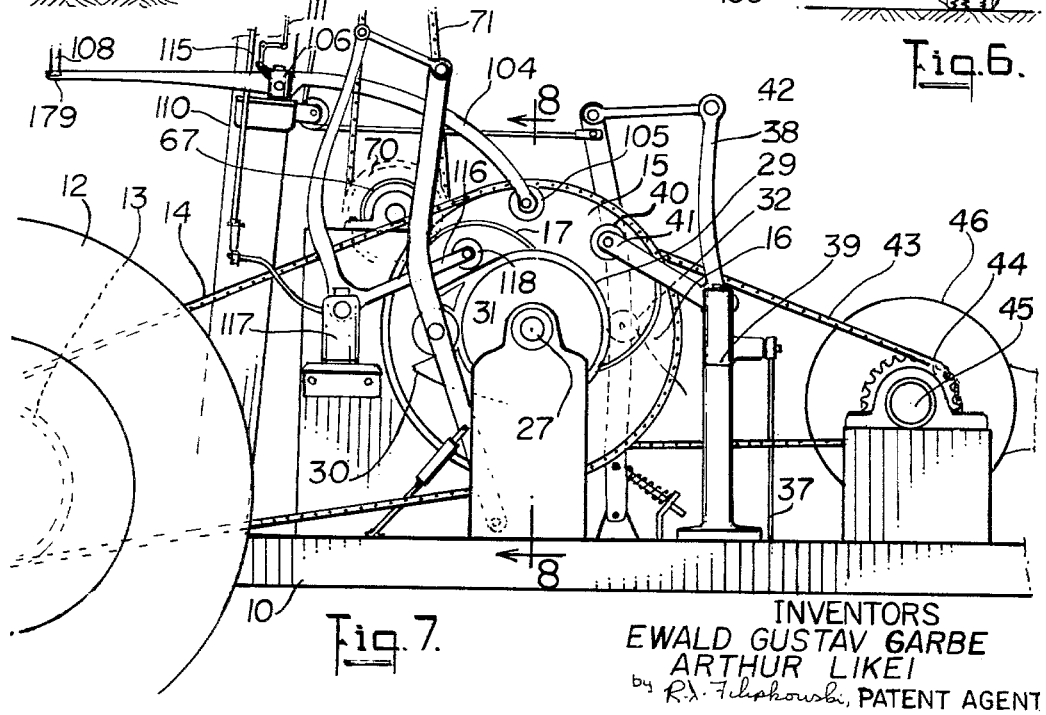
Fig.6.
Fig.7.
INVENTORS
EWALD GUSTAV GARBE
ARTHUR LIKEI
by R.J. Filipkowski, PATENT AGENT INVENTORS
ARTHUR LIKEI
EWALD GUSTAV GARBE
by R.J. Filipkowski
PATENT AGENT

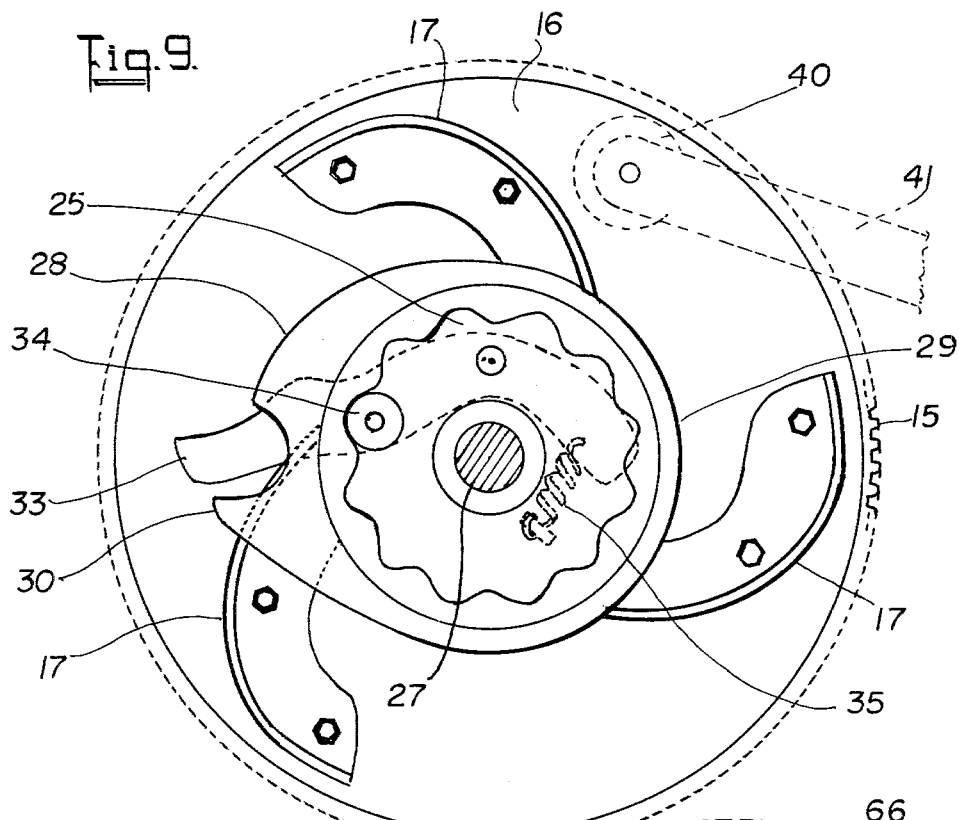
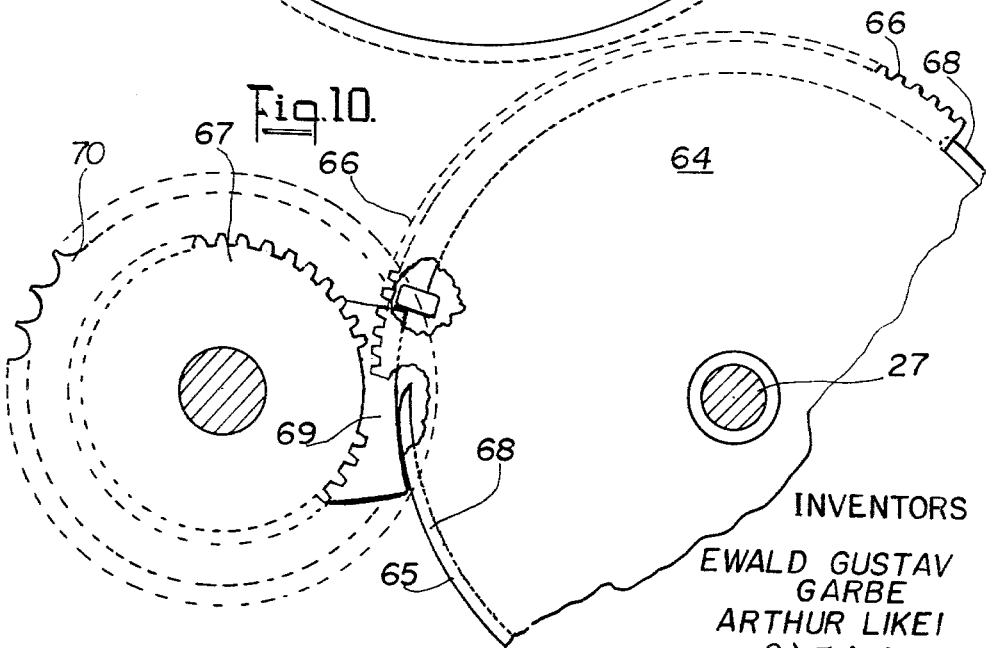

INVENTORS
EWALD GUSTAV GARBE
ARTHUR LIKEI
by R.J. Filipkowski
PATENT AGENT

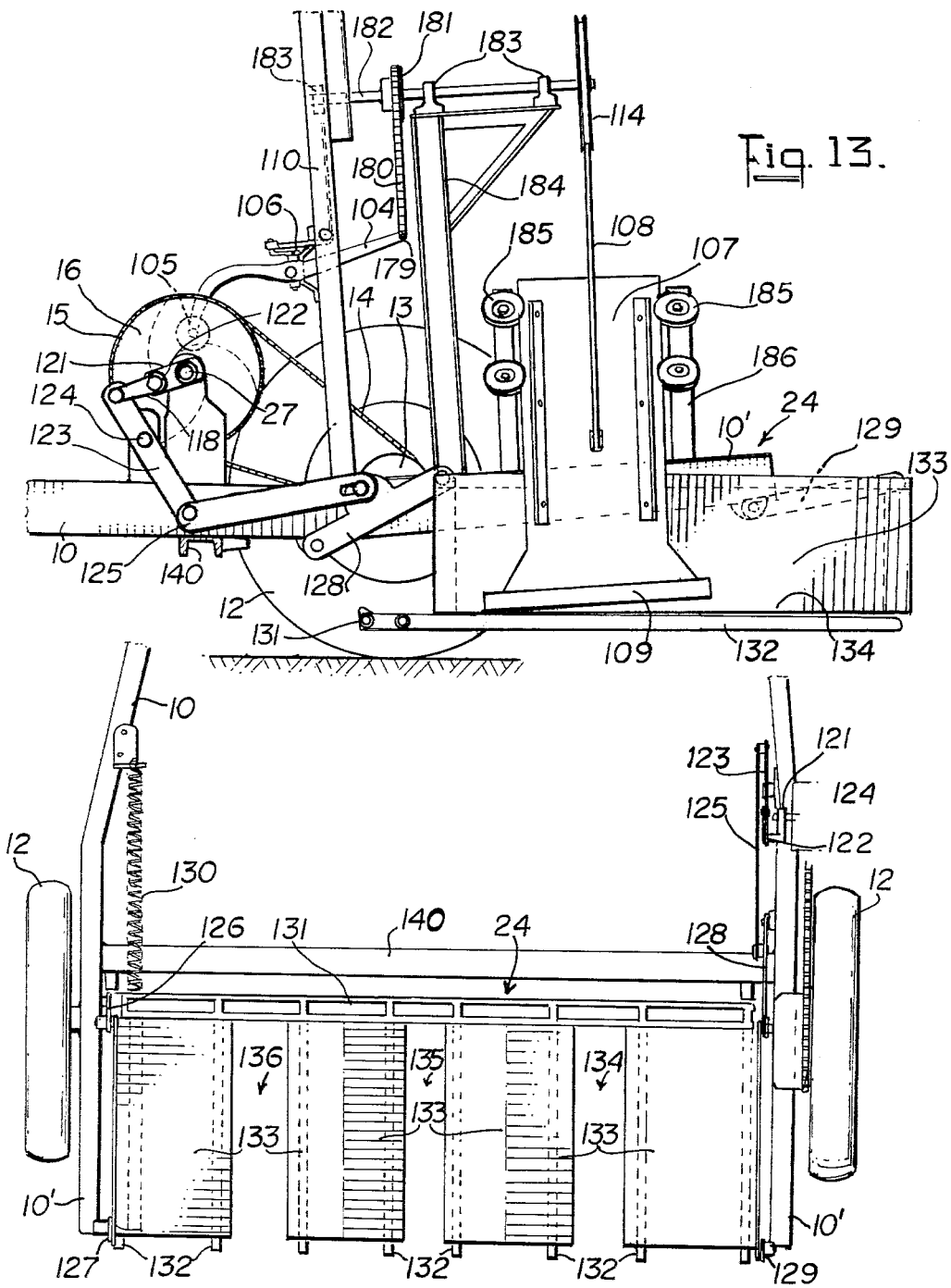

INVENTORS
EWALD GUSTAV GARBE
ARTHUR LIKEI
by R. J. Filipkowski
PATENT AGENT

United States Patent Office 3,223,253
Patented Dec. 14, 1965

3,223,253
BALE STOOKING MACHINES
Ewald Gustav Garbe, 1032 Bellevue Ave. SE., and Arthur
 Likei, 521 11th Ave. SE., both of Calgary, Alberta,
 Canada
Filed Feb. 7, 1962, Ser. No. 171,714
12 Claims. (Cl. 214—6)

This invention relates to forage handling machinery and more particularly relates to automatic stacking machines for receiving stackable articles such as bales produced by a hay or straw baler and building stacks on the field.

An automatic stacking machine for bales of forage or straw according to the invention comprises an elongate wheeled horizontal frame adapted to be hitched for towing behind a baling machine which discharges formed bales to the rear for receiving bales therefrom and to produce orderly stacked groups which are deposited on the ground when completed.

The purpose of the machine is to produce stacks of prismatic bales as they are formed by an associated baling machine, and to erect such staks automatically without any manual attention or labour, the entire operation of the machine being self-controlled throughout a stack building cycle, employing any suitable source of power which may be indirectly supplied from the towing tractor through a ground-engaging wheel on the stacking machine.

The invention is specifically embodied as a wheeled trailing vehicle having a hitch point at its forward end adapted to be connected to a hitch point provided at the rear of a powered baling machine, and carrying a longitudinal delivery chute pivoted in the forward end of the vehicle and having its rearward end adjustable automatically to deliver bales to the rear of the machine and to deposit each consecutive bale of a group, for example six, in its correct stacking relationship upon a stack carrier to form a stack with provision to set the completed stack on the ground and to discharge it automatically.

Essentially the invention consists in the provision of a towable wheeled vehicle having a delivery chute for receiving each bale as it is ejected from a baler, a trip responsive to the arrival of a bale in the chute, mechanism for carrying the bale along the chute to deliver the bale to a stack carrier, means for pivoting the bale chute about two axes at right angles to each other in the forward end of the frame, a retractable extension chute for guiding and depositing each bale as it leaves the main chute into its correct position on the carrier, a mechanism for positioning the delivery end of the chute with respect to the respective stack positions, and means for depositing the bale stack upon the ground from the carrier when the stack is erected.

When rectangular bales such as conventional 14-inch by 18-inch cross section bales are stacked with their longer dimension parallel to the ground and their intermediate dimension inclined to the ground at about 50 degrees to produce a stack which may be termed "prismatic" in form, the bottom tier of bales requires that an end bale be inclined at an opposite angle from the vertical from that of others in the tier, to act as a brace. Such stacking arrangement is known per se and provides a braced structure so that in a six bale stack two of the bales of the bottom tier, the two bales of the middle tier, and the top bale are all inclined at 50 degrees with their rain-shedding sides exposed to the weather. The end bale, when turned to the opposite inclination, will then have its weather-resistant side also upward. To achieve this stack form the apparatus of the present invention also preferably includes a means for rotating through 90 degrees that end bale of the bottom tier employed to brace the stack.

If forge bales of square cross section are harvested, such turning provision may also be necessary since the packing of forage stems may render the bales less weather resistant on certain sides than on others.

The automatic sequence of machine operations, to be described hereinafter in particular detail, with specific reference to accompanying drawings, will be outlined in the following preliminary statement describing operations in a more general manner.

Each operation is programmed to be effected within a specified distance of forward travel of the stacker machine so that the whole sequence is recurrent upon traversal of a minimum towing distance, which may be, for example, 24 feet.

The bale ejected from the towing baler is pushed with its intermediate dimension in the horizontal plane upon a receiving platform at the forward end of the stacker attached to one side of an open-topped bale delivery chute, whose walls are inclined at about 50 and 40 degrees respectively with the vertical, forming a right-angled trough between them. The bale is tipped by force of gravity and slides from the platform into the chute, assuming the inclination of its side walls, which correspond to the inclination of the majority of bales in the stack. A weight detector actuated when the bale is received in the chute causes a drive chain to be powered and a projection on the chain which etxends into the trough engages the bale and hauls it along the chute.

As the bale progresses to a point near the rearward end of the chute, a temporary support slide is engaged to move out from under the delivery chute in synchonism with the bale movement, so that ultimately the entire length of the bale is supported on such temporary support slide immediately adjacent the rearward end of the chute and just above the position the bale will assume in the stack carrier. The temporary support slide is then rapidly retracted, allowing the bale to fall a short distance into a trough in the carrier above which the delivery chute is registered, as the first bale of the bottom tier of the stack. The carrier comprises three longitudinal troughs in side-by-side relation, disposed just above the ground, and open along their bottoms.

The inclination of the first bale deposited in the carrier is preferably altered for the reason explained above, for example by means of mechanism which operates to hook the bale by a lower corner and rotate it through 90 degrees as it rests in the first trough, such mechanism commencing the turning operation shortly after the bale is deposited and while the delivery chute is being positioned to deliver to the second position of the bottom tier.

The drive chain continues to run to return the bale-hauling projection to the starting point, while chute positioning mechanism becomes powered to commence the lateral and vertical positioning of the delivery end of the chute to register it in relation to the trough of the second stack position in the stack carrier. Such positioning is effected by movement imparted to a chute suspension means by means of an endless chain having its lays convoluted in the pattern of horizontal and vertical traverses which the chute must go through or along during the stack-building cycle. The time interval in which the positioning is effected is considerably less than the interval within which a succeeding bale from the baler could be delivered. The extent of the positioning movements will vary depending on the location of the bale next to be delivered to the temporary stack. A control wheel is employed to correlate the chute positions with indexing positions on the wheel and to stop drive to the positioning mechanism at predetermined positions. No further drive of the chute is possible until the next bale stacking subcycle is initiated in response to depositing of a succeeding bale on the receiving platform.

After the six bales are placed upon the carrier in succession to build a three-tier temporary stack, a drive mechanism becomes energized by actuation of a trip means by the control wheel to lower the completed stack upon the ground by means of a comb-like system of troughs which is drawn out from under the bales as they become ground-supported by reason of the forward motion of the stacker.

The motive power is supplied in a preferred arrangement of a towed stacking machine from the axle of a ground-engaging wheel. It is to be understood however that in a similarly organization stacking machine which is stationary with respect to a stack receiving conveyor or the like, any suitable conventional drive means may be employed. The entire system of drives is geared together to maintain precise operating relationships, the primary driving member preferably having the form of a sprocket carried by a ground-engaging wheel and connected by a drive chain with a system of clutches and transmissions to be described later herein.

The invention will now be described with particular reference to its preferred embodiments, as shown by the several figures of the accompanying drawing, wherein:

FIGURE 2 is a frontal end view of a stack of blades as erected according to a programmed sequence of stacking operations;

FIGURE 2A is a view similar to FIGURE 2 showing a stack erected by a modified stacking program to produce a ventilated and rain-shedding stack;

FIGURE 3 is a side elevation view of a stack showing the relationship of bales with conveyor chute positions in dashed outlines and the resulting ground-supported stack in solid lines;

FIGURE 4 is a perspective view showing the pivoting movements of the conveyor chute of FIGURE 1 with respect to a stack and the relative movements of positioning guide means;

FIGURE 5 is a left side elevation view of a bale stacking machine according to the invention showing alternate stack carrier position in phantom outline;

FIGURE 6 is a rear elevation view;

FIGURE 7 is a partial right side elevation view;

FIGURE 9 is a detail of a driven drum gear and self-disengaging clutch of FIGURE 8;

FIGURE 10 is a detail of an intermittent gear drive train forming part of the drive to the chute positioning means;

FIGURE 13 is a side elevation view of a bale turner;

FIGURE 14 is a plan view of a stack carrier and actuating means therefor;

FIGURE 17 is a plan view projected on plane designated by line 17—17 in FIGURE 16.

Figure 1:
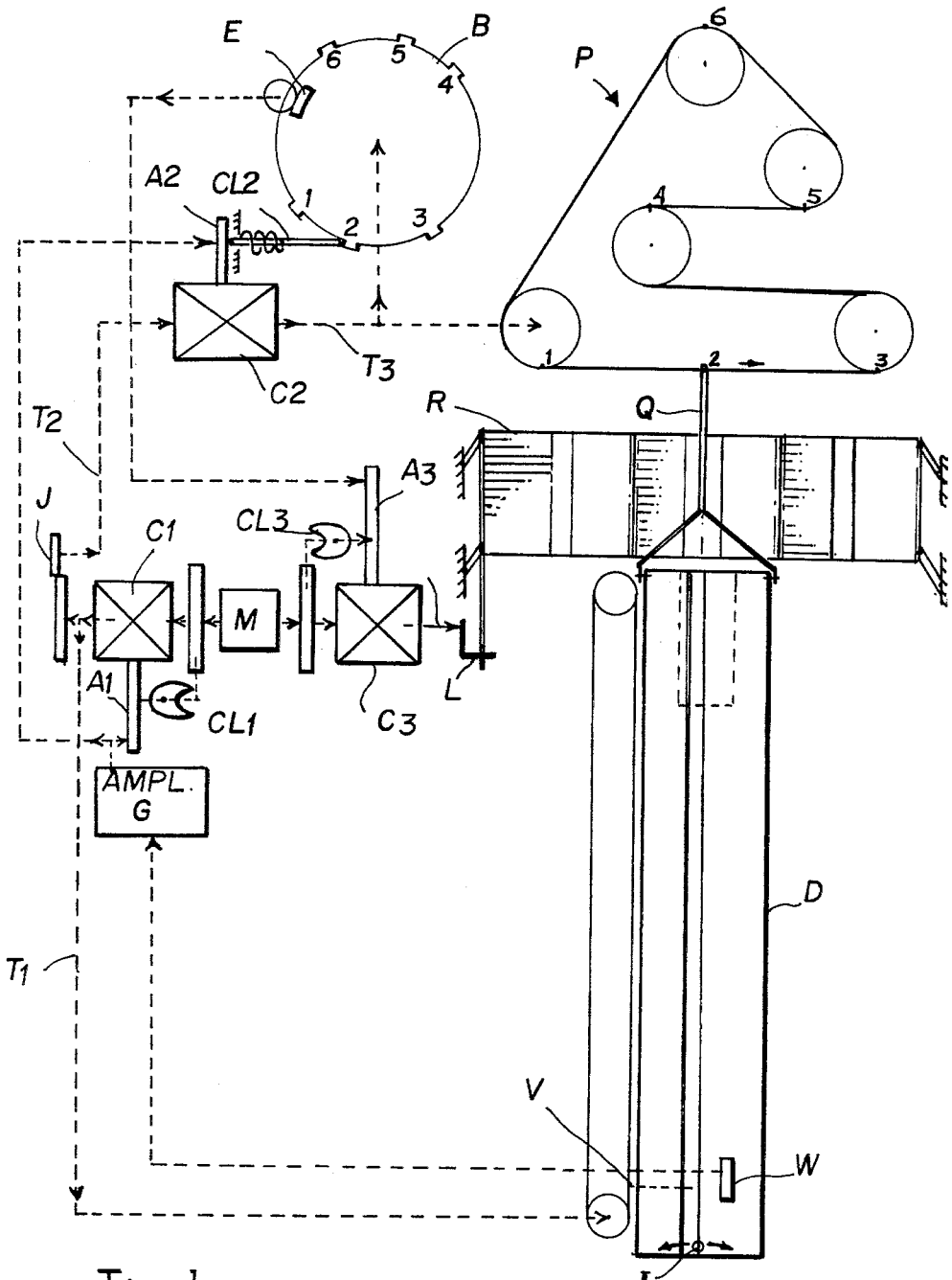
FIGURE 1 is a generalized diagram of mechanism according to the invention for carrying out automatically a programmed sequence of stack building and erecting operations.

Referring now to the schematic mechanical outline diagram, FIGURE 1, bales or other stackable objects designated S having square or rectangular cross section are fed, as from a bailing machine (not shown) into the conveyor chute D which pivots on the axis I. The arrival of a bale or other objects actuates weight detector device W causing force to be transmitted by way of mechanical amplifier G to effect tripping of clutch actuator devices A1 and A2 respectively controlling the engaged or disengaged states of clutches C1 and C2. C1 is self-disengaging once it has been engaged, upon completion of a predetermined driven rotary motion, for example one whole revolution, whereupon restoring cam CL1 disengages C1 through A1.

Motive power is transmitted from driving unit M to delayed drive train J, and to first transmission T1, thereby energizing bale conveyor drive mechanism V. The bale is engaged and moved toward the carrier R and is deposited thereupon in appropriate position according to the requirements of the stack building sequence, and drive to energize chute position mechanism P commences thereafter, being transmitted by way of transmission T2 from train J and by way of clutch C2 (previously engaged) to operate T3. The latter transmission drives both control wheel B and chute positioning mechanism P jointly and in synchronism. Reset link CL2 associated with B was previously displaced from its wheel stop position as W was operated by the entry of a bale into the chute.

As control wheel B turns, the next stop on its periphery which for example is stop #2, strikes CL2 and clutch actuator A2 is rapidly reset thereby to restore clutch C2 to disengaged position. Accordingly, drive to B and mechanism P is stopped, leaving chute D in the next stacking position, namely in stack position No. 2. After the last bale, which is No. 6, has been placed on the carrier, the positioning mechanism P and wheel B run to move chute D to No. 1 stacking position, during which movement cam E on wheel B trips clutch actuator A3. Drive from motive power source M is transferred via clutch C3, now engaged, to rotate crank L and thereby to effect a lowering movement of stack carrier R followed by a raising movement. Upon completion of the cycle with L returned to the starting position, C3 is disengaged by automatic clutch release cam CL3. The stack building sequence may be continuously repeated in the manner described as further bales or other stackable objects are received, it being understood that the stacking machine is movable relative to the stack receiving means, which may be the earth as in fodder harvesting over which a baling machine is towed, or other conveyor means may be employed to remove stacks.

Referring to FIGURE 2, an idealized stack of rectangular articles S is represented in temporary stack form on a carrier R prior to lowering to the ground, to aid understanding of the practice of the invention. The stackable articles may in practice be bales of fodder of rectangular cross section as illustrated, such as standard 14″ by 18″ bales. All bales have their respective long dimensions and longitudinal axes parallel, and their ends lie substantially in vertical parallel planes. The bale which occupies the No. 1 stack position at the left end of the bottom tier has its longer cross-sectional dimension side inclined at about 40° to the horizontal and the shortest side inclined at 50°, while all other bales have their respective inclinations reversed. The stack is built so that the rain-shedding sides N of bales occupying No. 1, 3, 5 and 6 stack positions face outwardly whereby to make a relatively weather resisting and stable stack.

As the bales just prior to depositing upon the temporary stack must be disposed slightly above their rest position after they are deposited in order to allow free movement of the extension chute by means of which they are delivered as will be described later, the several delivery positions numbered 1, 2, 3, 4, 5 and 6 are shown to lie uniformly above the bottom edges of the bales, and along levels $H_1$, $H_2$, or $H_3$.

Referring additionally to FIGURES 3 and 4, when the length of conveyor chute D is a sufficient multiple of the vertical distance between successive tiers of bales, namely the distance between levels $H_3$ and $H_2$, or between levels $H_2$ and $H_1$, the delivery positions correspond sufficiently closely to the idealized stack positions of FIGURE 2 so that a satisfactory stack is produced. When the carrier troughs R are inclined parallel to the axis of the delivery chute D as delivering to the second or intermediate tier of the stack, namely along a line parallel with $H_2$ of FIGURE 3, the bottom tier of bales and the top bale will lie slightly to the right of the bales in the second tier. For conveyor chutes having a length of the order of twelve feet and standard bales the discrepancy in vertical stacking is slight, as apparent from the outline in solid lines showing the stack erect as it would rest on ground level.

Similarly the discrepancy in the positions of bale end faces as best understood from FIGURE 4, as between the No. 2 bale and either of No. 1 or No. 3 bales, is also slight, and since the troughs of carrier R are parallel with the chute in the vertical plane while in No. 2 position, the bales are loaded into stack form with their longer axes substantially parallel.

The vertical and horizontal positioning guides P of FIGURE 4, by means of which the upper end of suspension link Q is constrained to move in a vertical or nearly vertical plane are preferably arranged to form a plane which is at right angles to the longitudinal axis of conveyor chute D when it is in the $H_2$ delivery position. The lower end of link Q is free to move in a spherical surface centered in the pivot I upon which the receiving end of the chute is supported to rotate about a vertical axis and a transverse horizontal axis intersecting in I.

While in some instances bales of forage or other material may advantageously be stacked in the closely fitted piled relation indicated by FIGURE 2, the ventilated stack form of FIGURE 2A is preferable for certain fodders and in localities where stacks may be required to withstand rain. As shown, bales occupying the No. 5 and No. 6 positions have lesser inclinations of their exposed faces N as compared with conventional stacks, due to the delivery position No. 5 being displaced laterally away from the No. 4 position. The outer edge of the bale overhangs at U, protecting the gap formed between adjoining faces of No. 3 and No. 5 bales. Stems of fodder protruding from the exposed edge U tend to deliver drip as from a roof eaves to fall upon the rain-shedding face N of bale No. 3. Similarly, by delivering bale No. 6 slightly to the right of its conventional position for a close-piled stack, this top bale will likewise have its edge U overhanging bale No. 5 to shed rain, forming a prismatic stack of superior rain-resisting ability. Moreover, the ventilating passages Z extending throughout the length of the stack afford greatly improved drying. Such stack form may readily be produced by the automatic stacking machine according to the invention, by adjusting stop positions of indexing wheel B, as will be described in detail hereinafter.

Referring to FIGURES 5 to 17, a preferred embodiment of the invention as generally described and schematically outlined hereinabove for automatically building and erecting stacks of bales and the like will now be described, wherein numeric reference characters will be employed to designate elements of mechanism for practicing the functions set out in FIGURE 1.

A stacking machine generally designated 100, comprises a towable wheeled horizontal frame 10 having a pair of ground-engaging rearwardly disposed wheels 12, and a hitch 11 connected with the forward end of the frame for towage behind a baler or source of bales (not shown) in bale receiving position therewith. An erect framework 110 inclined forwardly is fixed on frame 10 between the wheels transversely of the length of the machine. A bale conveyor chute extends from the hitch end to an aperture 150 in framework 110, its rearward end lying just above the forward end of a stack carrier 24 supported behind the wheels 12 between rearwardly extending portions 10' of the main frame and to the rear of a transverse frame brace 140 under framework 110.

Figure 8:
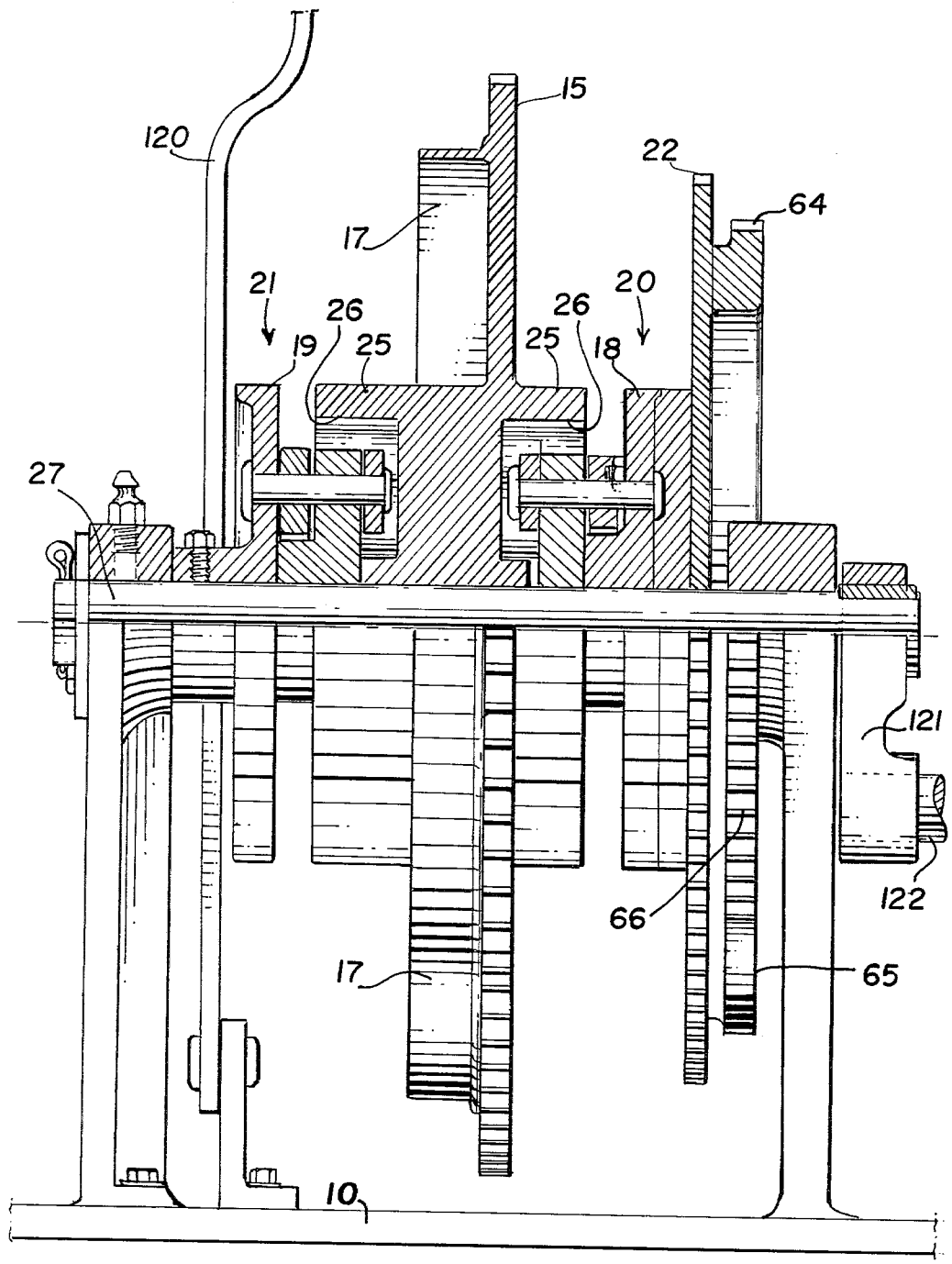
FIGURE 8 is a cross section taken on line 8—8 of FIGURE 7 showing clutch mechanism.

One of the ground engaging pair of wheels 12 has a bull gear 13 fixed on the hub to rotate about the wheel axis. A drive chain 14 engaged on the bull gear is coupled to drive a larger diameter driven gear 15 journalled in the frame 10 to run at a lower angular velocity. As best seen in FIGURES 7, 8 and 9, the driven gear carries a disc element 16 having a series of equi-angularly spaced outwardly spiralling flanges 17 fixed on a side thereof, and is engageable with driving members 18 and 19 by means of respective ones of a pair of clutch elements 20 and 21. The left-hand clutch 20 (which appears on the left side to an observer looking forward from the rear of the machine) is trip-operated in response to bale ejection as will be detailed later to couple the driven gear 15 with primary gear 22, the latter driving a torque tube 23 which in turn powers the bale carrier mechanism, the latter to be described later herein. The right-hand clutch is tripped in response to completion of a stack-building sequence to drive stack support and lowering mechanism of carrier 24.

In more particular, each clutch is of the type described in United States Patent 1,496,441 of June 3, 1924 and comprises a driving member in the form of a rotatable cylindrical shell 25 having fluted inner surface 26, journalled on shaft 27 which extends through and adjacent driven clutch disc 28 having a cam-shaped periphery including a circular arc 29 and a lobe 30, the peak of the lobe being concavely cut out as a circular segment 31 to hold a biased cam-follower roller 32 seated in the depression. A dog 33, FIGURE 9, pivoted in the clutch disc 28 carries a roller 34 which is held clear of the fluted surface as long as the cam-follower roller is seated in the segment 31 and in the released position the dog is spring-biased by spring 35 to engage the fluted shell 25 by the roller to couple the shell and dog, and thereby to rotate the disc. On completion of one revolution the cam follower 32 falls back into its biased rest position in the clutch disc segment to de-couple the dog from the shell which rotates freely thereafter.

On depression of the trip-plate 36 by an ejected bale 80 falling from receiving platform 47 attached to one side of bale chute 52 (see FIGURES 5, 6 and 11), a linkage 37 is actuated, which is arranged to swing an articulated lever arm 38 pivoted at one end 39 in the frame 10 sufficiently about a vertical axis so that a roller 40 journalled in its other end 41 moves into the plane of the spiral flanges 17 on the disc element 16. A spiral flange 17 engages the roller 40, causing it to rise up and swing the lever arm 38 about a horizontal axis, and a further lever arm 42 connected with the articulated lever arm pulls out the corresponding cam follower roller (not shown) from the left-hand clutch 20.

Figure 11:
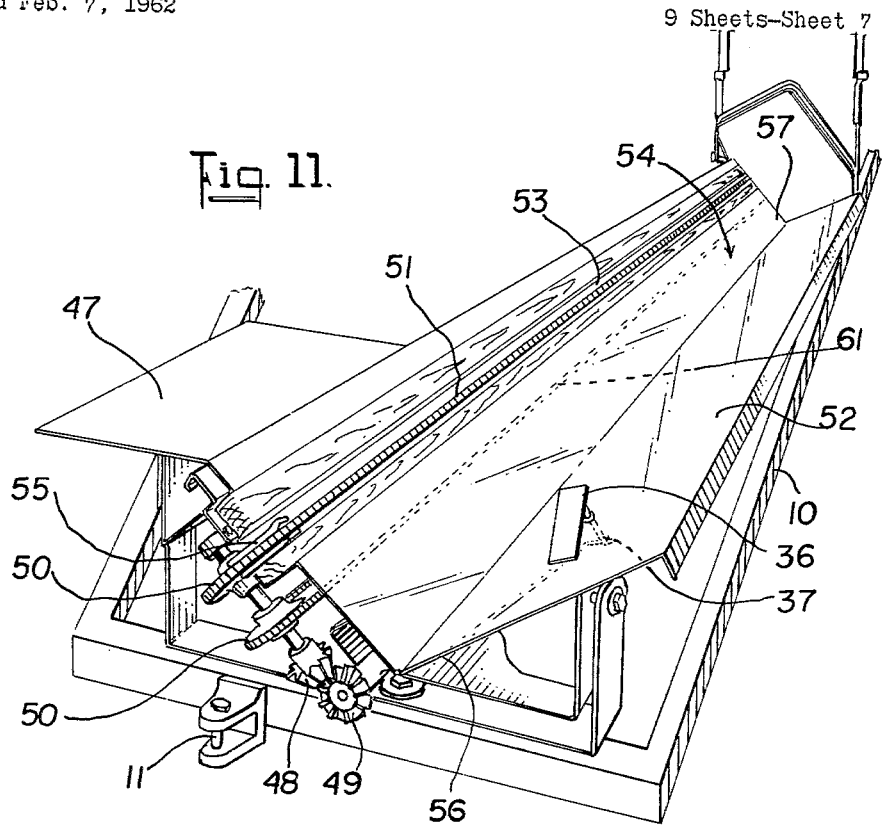
FIGURE 11 is a perspective view of the front or bale receiving end of the conveyor chute.
Figure 12:
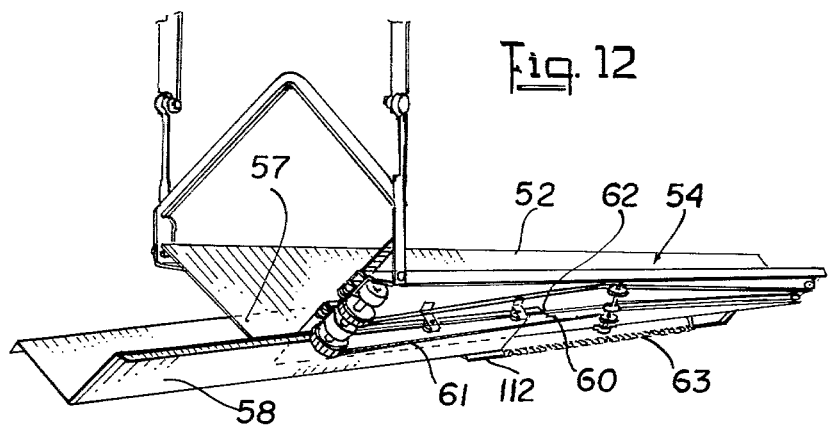
FIGURE 12 is a perspective view of the rear end of the conveyor chute, showing extension chute in extended position.

Primary gear 22 is then rotated while coupled with the driven gear 15 through one revolution. A sprocket 44, chain-driven from the primary gear 22 by chain 43 is fast on the input shaft 45 of a gear box 46 whose output shaft is connected with torque tube 23 to drive bevel transmission gears 48, 49 in the forward end of the machine frame. The latter in turn drives gears 50 which engage lays 51, 61 of endless chains extending the length of bale conveyor chute 52. The upper lay of chain 51 is recessed in a slot 53 exposed within the trough 54 of the bale conveyor chute, the other portion passes below. Fixed to the chain is a bale-engaging fork or prongs 55, as best seen in FIGURE 11. During the first half revolution of the primary gear 22, the fork or prongs move from a rest position just under the forward end 56 of the chute, to hook a bale and slide it to the discharge end 57. An extension chute 58 is pulled out from a guide ways 59 in which it is slidably received under the bale conveyor chute, when actuated by another projection 60 fixed on the chain 61 which engages a projection 62 on the extension chute. The bale is disengaged as the fork or prongs are retracted by passing of the lay to the under side of the chute, and the projection 62 similarly releases the extension chute allowing a restoring spring 63 to return it rapidly to its rest position under the bale conveyor chute. A shock absorbing bumper body 112 (FIGURE 5) receives the impact of the rapidly traveling extension chute.

During the second half of the revolution of the primary gear 22, the chain 51 is driven a sufficient distance so that the fork or prongs are brought back to the rest position near the forward end of the chute; at the same time an intermittent drive gear (FIGURES 8 and 10) having no teeth on a portion 65 of its periphery which is fixed to the primary gear 22 turns sufficiently so as to engage its toothed portion 66 with a complete mating intermediate gear 67. A holding sector 68 on the side of the intermittent drive gear is turned out of engagement with a concavely-shaped holding element 69 fast on the side of the intermediate gear. The rotation of the intermediate gear causes a chain drive sprocket 70 coupled to it to drive a chain 71 and a driven sprocket 72, shown in FIGURES 5 and 7, to actuate the chute positioning mechanism 73 operated thereby.

Figure 16:
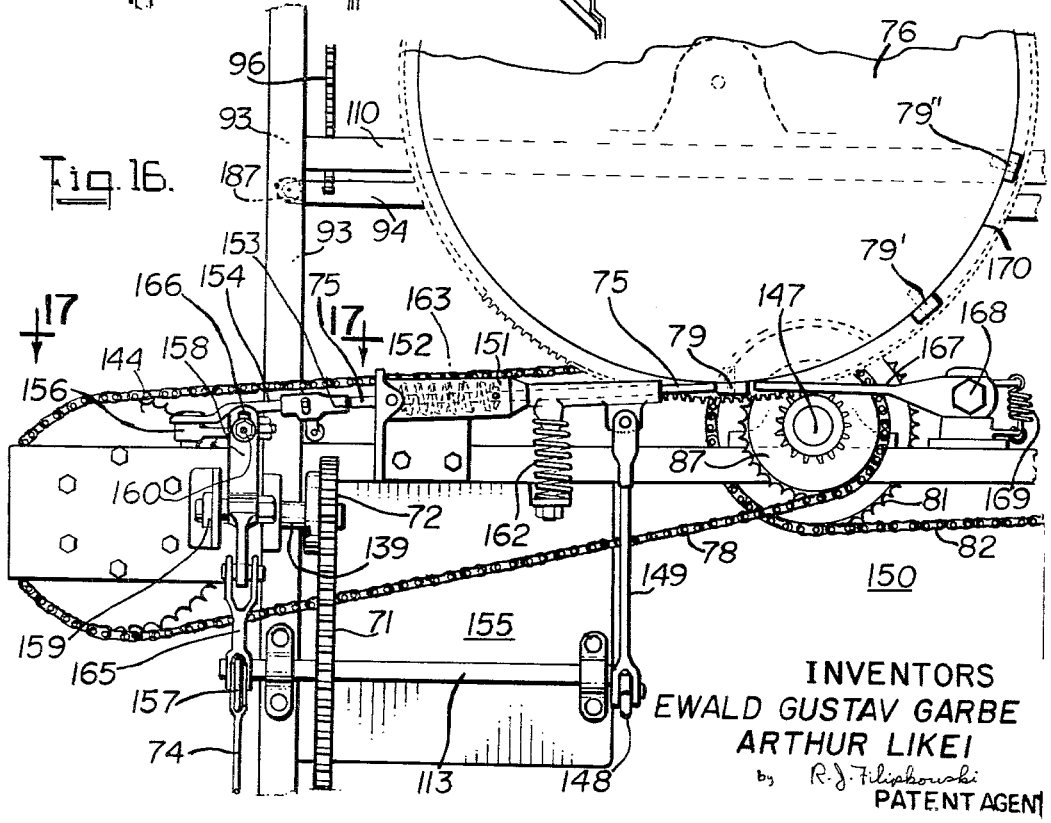
FIGURE 16 is a front elevation view showing drives and control means for chute positioning mechanism.

The positioning of the chute is effected by the following described operations, reference being also made to mechanism shown in FIGURES 16 and 17. When the cam follower roller 32 of the left-hand clutch 20 was retracted, in response to a bale 80 in chute 52, tension was applied to link 74 from the articulated lever arm 38 pulled out by a spiral cam 17, causing stop rod 75 holding control wheel 76 stationary to release, and also causing a chute positioning clutch 77 assembly to be actuated to its engaged condition. The clutch assembly forms part of a drive connecting the driven sprocket 72 with a further drive chain 78 connected to drive the positioning mechansim by way of sprocket 81. Accordingly, as soon as the intermediate gear 67 turns, drive is imparted via chain 71 to sprocket 72 fast on axle 139, to turn bevel pinion 141 engagaing bevel gear 142, and to turn clutch plates 143. When clutch actuator lever 145 (see FIGURE 17) is in engaged position the chain sprocket 144 is driven by clutch plates 143, transmitting power via chain 78 to chain sprocket 87 fast on axle 147. The latter is journalled suitably in bearings fixed on the overhead inclined frame 110, and supports spur gear 88 and positioning chain drive sprocket 81. The spur gear 88 is engaged in driving relation with the toothed periphery 89 of wheel 76, whose diameter is a multiple of that of gear 88.

Clutch actuator arm 145 pivoted on pivot pin 146, is urged into position to engage clutch assembly 77 by rotation of shaft 147 in such sense as to swing arms 148 and 157 downwardly. Arm 148 is linked by rod 149 with a housing 151 in which stop rod 75 is reciprocable. Hence as arm 148 swings down, in response to movement of clutch operating member 42 associated with clutch release roller 32 pulling cable 74 downward, housing 151 pivots about pin 152 against restoring spring 162 to pull rod 75 down clear of the path of stop 79 carried on wheel 76. At the same time, arm 157 pulls control link 165 down, to swing pivoted bracket 158 about a horizontal axis in pivot bearing 159 after the link 165 has moved a predetermined distance. The bracket is apertured at 166 to receive a shank portion of actuator rod 160 protruding therethrough, supporting bias spring 161 captive thereon between bolt head 162 and the bracket 158. An end of rod 160 is pivotably coupled to a plate 155 which pivots in the frame about an axis in pivot bearing 156 disposed near an edge of the plate when bracket 158 has traveled relatively to rod 160 a sufficient distance to compress spring 161. Upon further travel of the bracket to rotate plate 155 clockwise as viewed from above, an actuator link 164 also pivotably coupled by one end to the plate 155 is pulled in the direction of movement of the bracket. The other end of link 164 is connected to an end of actuator lever arm 145, whereby the engagement of clutch assembly 77 is effected as described; the clutch being of the type which remains engaged while lever 145 remains displaced as described.

The positioning mechanism receives drive from the transmission elements described, gear 88 turning wheel 76 clockwise. As the next succeeding stop, e.g., 79' passes the end of detent 167, the latter pivots about pin 168 and drops behind the stop under bias force exerted by spring 169. Stop rod 75, which has been released due to self-restoration of clutch 20 and return of lever 42 again lies in its normal position in contact with the circular rim 170, so that its outer end is impacted by the radial face of the stop 79'. The rod is urged axially inside housing 151 against the force of restoring spring 163, and the other end of its strikes an anvil 153, transmitting the force of the impact to link 154, which is loosely coupled therewith by one end. The latter has its other end pivoted in plate 155 and the applied force drives it counterclockwise to throw lever 145 into clutch-disengaged position. Bracket 158, which was also restored to normal position does not impede the motion of the plate as spring 161 is uncompressed on the shank of rod 160. Hence the rotation of wheel 76 and of the system of chain sprockets carrying chain 82 is arrested by resilient means which also effect the speedy disengagement of clutch 77 and further movement of the system in either direction is positively prevented by stop rod 75 and detent 167.

During the positioning operation, sprocket 81 drives the endless positioning chain 82 which loops back and forth over the group of sprockets 81, 83, 84, 85 and 86. These are mounted coplanarly with each other on axles journalling in respective bearings fixed on the inclined overhead frame 110 having their rotational axes parallel and spaced in a predetermined pattern. The control wheel 76 is driven in geared relation with the system of sprockets 81 and 83–86 so that it completes one revolution while the endless positioning chain 82 completes precisely one circuit.

For a six bale stack there are six peripheral stops such as 79, 79', 79" . . . on the control wheel, whose angular spacings are correlated with the movement of chain 82 to position the end of chute 52 into respective stacking positions. It will be seen that the rim 170 may support a large number of stops, whose positions will be chosen in accordance with the desired delivery positions. It will also be apparent that while the pyramidal stacking of a prismatic six unit stack of bales has been described for purposes of illustration herein, stacks of other forms such as 10 unit, 15 unit, etc., may be accommodated, provided the dimensions of the articles being stacked permit stacks of appropriate lateral and vertical extent in relation to the chute length, by re-arranging the sprockets supporting chain 82 and by suitably locating stops about the wheel 76. Moreover, in the construction of ventilated stacks of the form illustrated in FIGURE 2A, the setting of stops controlling delivery to the No. 5 and the No. 6 stack positions may be readily carried out when the stops are bolted or otherwise detachably attached to the rim 170.

One link 90 of the chain 82 holds the chute guide framework 91 from which the discharge end 57 of the bale conveyor chute 52 is suspended. The lays correspond to the locus of offset positions occupied by the discharge end of the chute as it is moved horizontally from the first or rest position, into second and third stack positions corresponding with link positions along the lowermost lay of the chain, into the fourth and fifth stack positions corresponding to link positions along intermediate lays, and into the sixth position corresponding to the highest point reached by the link in passing over topmost sprocket 86.

As the support link 90 moves the chute carrier 91 back and forth throughout its path of motion, a movable vertical carrier frame 92 is guided for vertical motion in the inclined fixed frame 110 which lies generally at right angles to the forward direction, in channels 93 fixed thereon to the rear of the frame. The chute carrier 91 is guided to move laterally along the horizontal ways 94 of the vertical carrier frame, so that the chute carrier 91 may traverse to the desired positions up and down or left and right. Suitable roller means as 187 are preferably journalled in the ends of the vertical frame channels 94 and also in the ends of chute carrier 91 guided in the ways 94.

A coil spring 99, seen in FIGURE 6, wound about a transverse axle 171 journalled in the upper end of frame 110, applies torque to a pair of chain sprockets 95, the latter being engaged with lays of chain 96 depending therefrom. One end of each lay is attached to an end of lateral guide ways 94, while the other end of each lay is connected to a bar 172 free to move up and down in suitable guides (not shown) fixed along the forward side of the fixed frame. The application of torque is in such sense as to elevate the movable vertical frame 92, and in such amount as will approximately counterbalance the weight of the suspended chute guiding means and of the delivery end of the unloaded chute.

As the movement of the chute is restricted to times when it is unloaded, the state of relative weightlessness minimizes stress on the elements of mechanism generally designated by 73. Under certain field conditions, particularly when the machine is towed at a brisk rate, the chute, while loaded, may "bounce" excessively and thus damage the machine. Moreover, bales of relatively great weight may occur, as compared with average bales, so that application of stronger spring force does not produce a satisfactory result either for unloaded or variably loaded conditions.

Figure 15:
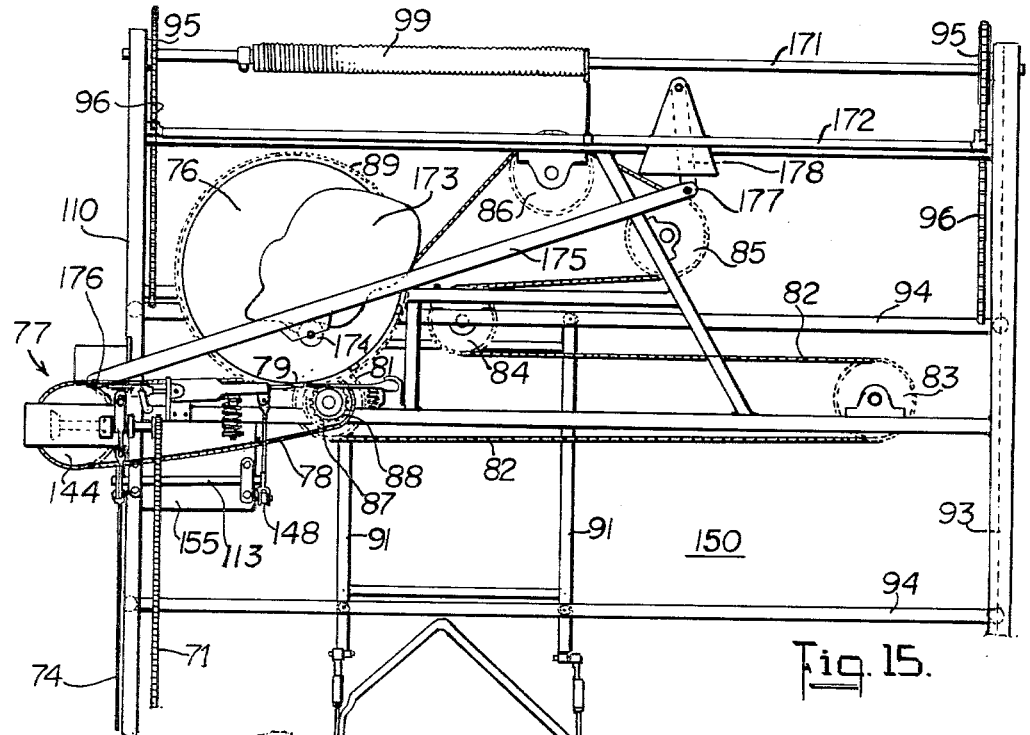
FIGURE 15 is a frontal view corresponding to FIGURE 6 showing a positive support lever arm and cam for guiding the chute suspension.

Apparatus illustrated in FIGURE 15 provides positive support for the chute and support structure at all times regardless of the load carried, by carrying any unbalanced load tending to depress the chute end 57 by means of a support cam 173. The latter is disposed forwardly of and is fixed to the side face of wheel 76 for rotation as a unit therewith and has its periphery shaped so that a cam follower roller 174 journalled suitably in a lever arm 175 pivoted at 176 will bear against the periphery of the cam when the end 177 is lifted by link 178 pivotably connected with bar 172.

The periphery of the cam is correlated with the diameter of the follower roller 174 and in conjunction with the distance between the contact point of the latter on the cam and the pivot axis in 176, so that bar 172 maintains a vertical position relative to axle 171 which is complementary to the desired position of link 90 with respect to the axle. Any adjustment of chute positioning stops 79 therefore does not necessitate any change of cam profile. Chain 82 is consequently not required to carry any substantial downwardly directed loads, and since bounce is restricted to upward deflection of the lays of chain 82 and downward excursions of bar 171, the machine may travel over uneven ground with relative stability of chute 52.

The control wheel also carries two further cams 97 and 101 (see FIGURE 6), which have the form of axially offset sectors radially and angularly spaced upon a side face of control wheel 76. Each cam has a planar dwell face and ascending and descending sloped portions inclined with respect to the face of the wheel. The sectoral cam 97 actuates its follower 102, pivoted in frame 110, shortly after the first bale is deposited in the trough of the stack transporter 24, thereby actuating linkage means 111 to swing a pivoted arm 104 (see FIGURE 7) having roller 105 journalled in its end into engagement with a spiral flange 17. As the roller end of arm 104 becomes power elevated, the arm pivots about a horizontal axis in a dual-axis pivot structure 106. The other end 179 is coupled to transmit drive to a bale turner slide 107 (see FIGURE 13) resting along a side wall of the first position trough 134.

The downward swing of arm 104 draws down chain 180 attached to arm end 179, turning sprocket 181 fixed on axle 182. The latter is journalled suitably in bearings 183 supported on the fixed inclined frame 110, and also on a pedestal 184 disposed behind and parallel with the frame. A pulley 114 fixed on axle 182 is thereby rotated, to apply drive by means of a band 108 attached to its periphery to move the slide. The bale turner slide moves upwardly in an inclined plane, guided by its side margins which move in grooved guide rollers 185 journalled in columns 186 spaced at the sides of the slide and fixed upon rearward frame extension 10'.

As the slide rises, a terminal flange 109 which extends at right angles from its lower end in alignment with the associated side wall of the carrier trough tips a bale resting therein (not shown) so that it is turned a quarter turn about its longitudinal axis and drops back into the trough with its water shedding side upward. The flange 109 remains resting upon the bale until the latter is removed, as will be apparent from the description of the stack lowering operation to follow. The weight of the slide biases it into its lowered position after the bale stack is removed, whereupon flange 109 again lies conformably in the first position trough.

When the sixth bale has been deposited on the temporary stack, the control wheel has rotated sufficiently so that the second sectoral cam 101 engages its cam follower 103 movable about a pivot axis in frame 110, to actuate a linkage system generally designated 115. A lever arm 116 is thereby swung about a vertical axis in pivot structure 117 to bring roller 118 into the path of spiral flanges 17. Lever arm 119 joined to arm 116 actuates horizontally projecting lever arm 120 of clutch 21 causing the withdrawal of release roller 32. As this roller is released, the axle 27 which is now engaged with dog 33 is turned one revolution to rotate a crank 121 (see FIGURES 13 and 14). The crank is connected by pin 122 with a beam 123 pivoted at 124 in the frame 10, which beam has one end coupled to rearwardly extending link 125. The latter is connected to a carrier support pivot arm 128 that raises and lowers the stack carrier 24.

When the carrier is in its raised position it rides upon the upper ends of four support columns 126, 127, 128 and 129, pivoted at their lower ends in rearward horizontal frame extensions 10', and the structure is spring-biased by spring 130 applying a force directed toward the front of the machine to hold the carrier in raised position above the frame. As best understood by reference to FIGURES 5, 6, 13 and 14 the carrier structure comprises a comb-like framework comprised of transverse forwardly located tubular framing 131 having rearwardly extending tube frames 132 supporting V-shaped metal walls 133 to form the three open-bottomed right-angled troughs 134, 135 and 136. Side panels for the carrier comprise a longitudinal upper frame member 137 connected by its ends with vertical stand-offs 138 with the side tubular members 132. The carrier tends to maintain itself in raised or bale-receiving position, due to the weight of bales carried, as well as its own empty weight, which loads tend to rotate the pivoting support links against holding stops in the frame (not shown). The lengths of the columns or links are preferably substantially identical, but one pair, for example the rearward pair, are inclined a few degrees backwardly out of parallelism with the front pair 126 and 128. When the rearwardly extending link 125 is moved back, as when axle 27 has completed a half turn to drive the lower end of beam 123 rearwardly, the rearward pair 127 and 129 have swung more nearly horizontal than the front pair. This has the effect of dropping the trailing ends of the carrier tube frames and of the trailing ends of bales in Nos. 1, 2 and 3 stack positions, with respect to the forward part of the carrier. Consequently the bales are pulled down the inclined support troughs by friction with the ground, and the stack is thereby slid off the transporter without being significantly disturbed. The unloading operation commences prior to completion of the first half-revolution of axle 27, and is completed before the rearward end of the carrier is elevated to any substantial extent as would interfere with the unloading. In general, if the axle 27 rotates one-half revolution for a forward travel of the machine of about eight feet the unloading operation will be satisfactory, when the carrier in raised position is about one foot to 14 inches above ground level.

During the second half revolution of crank shaft 27 the stack transporter is raised by virtue of movement of link 125 which effects movement of the carrier structure which are the reverse of those described above. The clutch 21 disengages upon the completion of the raising movement, and the stack transporter is again ready to support bales as the stack is built.

It will be understood that many modifications of structure may be made without departing from the practice of the invention in its most general comprehension and scope. Moreover applicants intend that this specification be construed as extending to apparatus devised in accordance with the principles herein disclosed for handling articles other than forage bales, and for constructing stacks or piles which may be comprised of dissimilar sizes of articles by automatic machinery. The construction of stacks comprising but two bales, or three bales, up to any practical number within the limits of the inventive concept by machinery according to the invention is accordingly reserved to applicants as set out in the appended claims.

What is claimed is:

1. Apparatus for stacking a group of articles in prismatic stack relation comprising a stack support, a conveyor for receiving articles at intervals of a predetermined length and having a delivery end, means for detecting receipt of an article upon said conveyor, means responsive to said detector for initiating movement of said article toward said delivery end, an indexing mechanism having a stored program of conveyor delivery positions, conveyor positioning means controlled by said indexing mechanism for directing delivery of each article received into consecutive horizontally adjacent stack positions in each tier commencing with an end position of the bottom tier and terminating with the delivery of an article to a terminal position of a top tier of said stack, said positioning means comprising drive means operable in response to said detecting means to position said conveyor within said interval and following delivery of the detected article, said drive means being disabled under control of said indexing mechanism upon completion of each positioning operation, and means for advancing said indexing mechanism concurrently with operation of said positioning means.

2. Apparatus as claimed in claim 1 wherein said stack positions in a tier are horizontally intermediate stack positions of vertically adjacent tiers.

3. Apparatus as claimed in claim 2, wherein said articles have cross-sections bounded by four sides meeting at right angles and said conveyor comprises an elongate pivotable chute having planar side walls inclined to the horizontal and having a horizontal receiving platform extending laterally from the upper margin of a side wall so that said articles deposited thereon are self-transferred to lie conformably in said chute.

4. Apparatus as claimed in claim 3 wherein said articles are bales and wherein bales occupying stack positions of said bottom tier are disposed with their like sides inclined to the horizontal with like inclinations and an end bale is in bracing relation and has its like side inclined in reverse inclination.

5. A towable bale stacking machine for erecting and setting bale stacks on the ground, comprising the combination of an elongate horizontal frame, a towing hitch at one end thereof, ground-engaging support wheels journalled in said frame, a transverse inclined frame supported on said frame and having an aperture, an elongate open-topped conveyor chute pivoted adjacent the forward end and extending into said aperture and having a pair of sides meeting at right angles each inclined to the horizontal, a stack transporter carried in said frame rearwardly of said chute comprising a plurality of open-topped, open-bottomed, and open-ended right-angled longitudinally extending troughs having side walls inclined to the horizontal according to inclinations of bale sides in the bottom tier of a stack, means to detect receipt of a bale in said chute, a powered drive means responsive to said detector to convey said bale toward a delivery end of said chute, means carried in said inclined frame operable from said drive for positioning the delivery end of the chute in vertical registry with stack positions of bales in said stack transporter, programming means for controlling the sequence of positions of said delivery end in a stack-building cycle commencing with positions in said bottom tier, control means responsive to said detector for moving said delivery end in accordance with said programming means following delivery of the bale detected, means for raising and lowering said transporter between stack receiving and stack unloading positions, and means for unloading said stack and returning said stack transporter to stack receiving position responsive to completion of a stack.

6. A bale stacking machine as claimed in claim 5 wherein said drive is powered from a ground-engaging wheel.

7. A bale stacking machine as claimed in claim 5 wherein said chute carries an extension chute extendable from said delivery end in the direction of movement of and in support relation with a bale delivered by said bale conveying means, and means to retract said extension chute when said bale is supported entirely on said extension chute at a rate such that the bale falls without significant rotation.

8. A bale stacking machine as claimed in claim 5 wherein said troughs of said stack transporter are aligned parallel with the longitudinal axis of said conveyor chute when the latter is positioned for delivery to a stack position intermediate the lateral and vertical extents of the stack.

9. A bale stacking machine as claimed in claim 5 wherein said inclined frame carries means for counterbalancing the weight of the delivery end of the chute.

10. A machine as claimed in claim 6 wherein said means for positioning the delivery end of the chute comprise a plurality of coplanar, spaced sprockets journalled in said inclined frame, an endless chain looped in a path about said sprockets whereof the lays simulate the locus of offset positions of said delivery end while moving between consecutive delivery positions, articulated means suspending said delivery end from a point in said chain, means to drive said sprockets under control of said programming means, and guide means in said inclined frame for restraining said suspension means for movement in a plane parallel with the plane of said lays.

11. An automatic bale handling machine comprising the combination of a towable wheeled framework having ground engaging support wheels and a hitch end and having a pair of parallel transversely spaced rearwardly extending frame members inclined forwardly downwardly, a bale stack carrier supported between said pair of frame members comprising a generally horizontal comb frame having a plurality of trough-shaped bale supports longitudinally aligned parallel with said frame members and having open rearward ends and open tops and bottoms, pairs of longitudinally spaced support columns of equal length having their one ends pivoted in said frame members and their other ends pivoted in the sides of said comb frame for supporting said carrier in raised position from said members when said columns are erect and to discharge a stack of bales when said columns are rotated about the pivots in said frame members into rearwardly inclined positions, the rearward column of each pair being inclined backwardly from the forward column so that the trailing edges of bales touch the ground first when said carrier is lowered, means to place bales in stack positions on said carrier when in raised position to build a prism-shaped stack with the front ends of bales in upper tiers overhanging the lower tiers, and powered crank means driven from a ground engaging wheel operatively coupled with said columns and responsive to delivery of a qucta of bales for a stack to lower said carrier upon predetermined forward travel and to raise said carrier upon further predetermined travel.

12. A machine as set forth in claim 11 further including means to turn a first bale placed in an end bale support trough of said carrier one-quarter turn about a longitudinal axis before a second bale is placed on said carrier.

References Cited by the Examiner

UNITED STATES PATENTS

| | | | |
|---|---|---|---|
| 277,220 | 5/1883 | Burr | 214—10.5 |
| 1,759,085 | 5/1930 | Bebinger | 198—119 |
| 2,065,673 | 12/1936 | Fay. | |
| 2,740,250 | 4/1956 | Olson. | |
| 2,822,659 | 2/1958 | Moore. | |
| 2,833,109 | 5/1958 | Walker | 56—473.5 |
| 2,856,062 | 10/1958 | Kling | 198—119 |
| 2,870,922 | 1/1959 | Thomson. | |
| 2,905,114 | 9/1959 | Olson | 214—10.5 X |
| 2,948,420 | 8/1960 | Stoecker. | |
| 2,977,002 | 3/1961 | Asp. | |
| 3,049,246 | 8/1962 | Bishop | 214—11 |
| 3,114,465 | 12/1963 | Widmer. | |

FOREIGN PATENTS 825,569    12/1959    Great Britain.
121,073    1959    U.S.S.R.

HUGO O. SCHULZ, *Primary Examiner.*

MORRIS TEMIN, *Examiner.*